United States Patent

[11] 3,578,867

[72] Inventor Alfred E. Barrington
 Lexington, Mass.
[21] Appl. No. 815,366
[22] Filed Apr. 11, 1969
[45] Patented May 18, 1971
[73] Assignee The United States of America as represented by the Administrator of the National Aerondutics and Space Administration.

[54] DEVICE FOR MEASURING LIGHT SCATTERING WHEREIN THE MEASURING BEAM IS SUCCESSIVELY REFLECTED BETWEEN A PAIR OF PARALLEL REFLECTORS
1 Claim, 3 Drawing Figs.

[52] U.S. Cl. .................................................. 356/103,
 250/218
[51] Int. Cl. .............................................. G01n 21/26
[50] Field of Search ....................................... 356/102,
 103, 201, 206, 207, 244, 246; 250/218

[56] References Cited
UNITED STATES PATENTS
2,080,613 5/1937 Lange ......................... 356/206

Primary Examiner—Ronald L. Wibert
Assistant Examiner—Orville B. Chew II
Attorneys—John R. Manning, Herbert E. Farmer and Garland T. Mc Coy

ABSTRACT: A method and device is disclosed for determining the gas density within a vacuum chamber by measuring the scattered radiation produced when a gas passes through an apparent single coherent beam of light. The beam is directed onto the first of a pair of highly reflective, parallel surfaces and caused to be successively reflected therebetween, the reflecting surfaces being located within the vacuum chamber.

The invention described herein was made by an employee of the United States Government and may be manufactured and used by or for the Government for governmental purposes without the payment of any royalties thereon or therefor.

PATENTED MAY 18 1971          3,578,867

ALFRED E. BARRINGTON
INVENTOR.

BY
John R. Manning
ATTORNEY

3,578,867

DEVICE FOR MEASURING LIGHT SCATTERING WHEREIN THE MEASURING BEAM IS SUCCESSIVELY REFLECTED BETWEEN A PAIR OF PARALLEL REFLECTORS

BACKGROUND OF THE INVENTION

This invention relates to pressure measurement and more particularly to a pressure measuring device capable of obtaining measures of the instantaneous pressure within an enclosure without mechanical or fluid connection to the volume within the enclosure.

The prior art is replete with pressure sensitive measuring devices designed and used for the measurement of reduced pressures within an enclosure. However, these devices usually either require that a pipe be connected to the enclosure or must employ some mechanical device that is positioned within the enclosure and connected to external indicating means. Many of these prior art devices, particularly the more sensitive ones, also require a cyclic manipulation by an operator before the pressure can be measured and, therefore, a significant time may elapse before a pressure sample may be taken and the reading determined. The present invention requires no physical connection between the gas inside the enclosure and the measuring device, nor does it require any mechanical device within the enclosure that will be acted upon entirely upon the amount of photon scattering from a beam of light that has been projected into the enclosure. The scattered photons within the chamber may be detected by suitable light detecting instruments placed outside the chamber to give an indication of the pressure of the gas within the enclosure.

SUMMARY OF THE INVENTION

This invention provides a device for determining the instantaneous gas density within an enclosure by measuring the scattered radiation generated when multiple passes of a coherent light beam pass through an evacuated chamber. The reflected coherent beam of light has an intensity equal to just less than the intensity of the incident beam. The device utilizes a pair of planar, highly reflective mirrors placed within the enclosure of the chamber; a window for allowing a beam of coherent light into the enclosure; and, photodetector means for measuring the scattered radiation produced when the beam passes through any gas that may be in the chamber.

It is a well known fact that a beam of light passing through a gas will be scattered at random by the gas atoms in accordance with the following formula:

$$i = I_0 \frac{k(1+\cos^2\theta)n}{\lambda^4} \phi \qquad (1)$$

where:
$i$ = the intensity of the scattered light into a solid angle $\Phi$
$I_0$ = the incident intensity;
$k$ = a constant which depends upon the nature of the gas particles.
$\eta$ = the angle between the incident and scattered light;
$n$ = the density of the gas particles; and, $\lambda$ = the wave length of the incident light.

This formula holds if the dimensions of the gas particles are small compared with $\lambda$, the wave length of the light. When a mixture of gases is used or when the gas is composed of large molecules, the scattering will still be proportional to the gas density.

In those cases where an infinite number of beams could be used, the total measured intensity of the scattered light produced would be equal to about the sum of the intensity of scattered light produced by each beam. An infinite number of coherent beams could be approached by directing a single coherent beam of light obliquely onto the surface of a first planar mirror having an extremely highly reflective surface and then directing the resulting reflected coherent beam obliquely onto the surface of a second planar mirror disposed parallel to the first mirror, the reflecting surfaces of both mirrors having about equal reflective efficiency. The total intensity of the resultant coherent light beams that are produced by such an array of multiple reflected beams, all lying in the same plane, is determined in accordance with the following formula:

$$S_\infty = \frac{I_0}{1-\eta} = KI_0 \qquad (2)$$

where:
$S_\infty$ = the total intensity of all the beams of light;
$I_0$ = the incident intensity;
$\eta$ = the reflective efficiency of each mirror; and
$K$ = a constant equal to $1/1-\eta$.

Thus, if the reflective efficiency of each mirror were equal to about 90 percent, then $S_\infty$ would be equal to about 100 times the incident intensity.

To illustrate, it has been calculated that if a coherent beam of light, having a cross-sectional area of about 1 mm$^2$ (about $10^{-6}$m$^2$) and a length of 1 meter, were projected from a ruby laser having one joule of energy at 6943 A., when passing through an enclosure containing a permanent gas at a pressure of about 1 torr and a molecular density of about $3 \times 10^{16}$ molecules per cubic centimeter, there will be produced a scattering of about $10^8$ photons. Accordingly, if the threshold of detection is taken as one photon, then the minimum detectable pressure determinable from the above-mentioned arrangement would be about $10^18$ torr.

It is, therefore, one object of the present invention to provide an improved gas pressure measuring device which avoids one or more of the disadvantages and limitations of prior art arrangements.

Another object of the present invention is to measure the gas pressure within an enclosure without any mechanical or fluid connection to the enclosed volume.

Another object of the present invention is to provide a gas pressure measuring device which responds instantly to variations of gas pressures.

The features of my invention which are believed to be novel are set forth with particularity in the appended claims. The invention itself, however, both as to its organization and method of operation, together with further objects and advantages thereof, may best be understood by reference to the following description taken in conjunction with the following drawings.

DETAILED DESCRIPTION OF THE PREFERRED EMBODIMENT

As will hereinafter be used, the term "transducer" refers to a device which receives light energy and transforms it into electrical energy. In the exegisis which follows, it is to be understood that this designation shall include all transducers which transform light into electrical energy such as, but not limited to, photoconductive cells, photoelectric cells, photomultiplier tubes, and all types of crystal and semiconductor elements whose electric properties vary with incident light energy.

Figure 1:
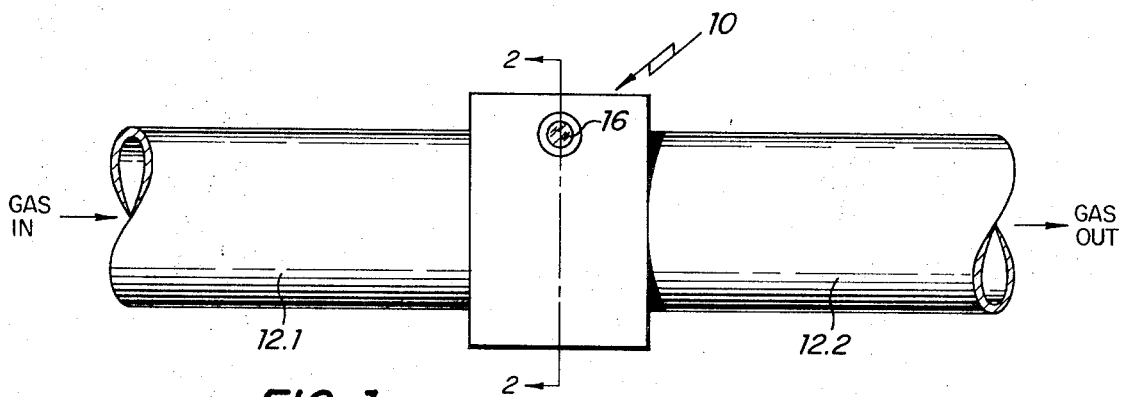
FIG. 1 is an elevational view of the device adapted for use in the exhaust line of a system being evacuated.
Figure 2:
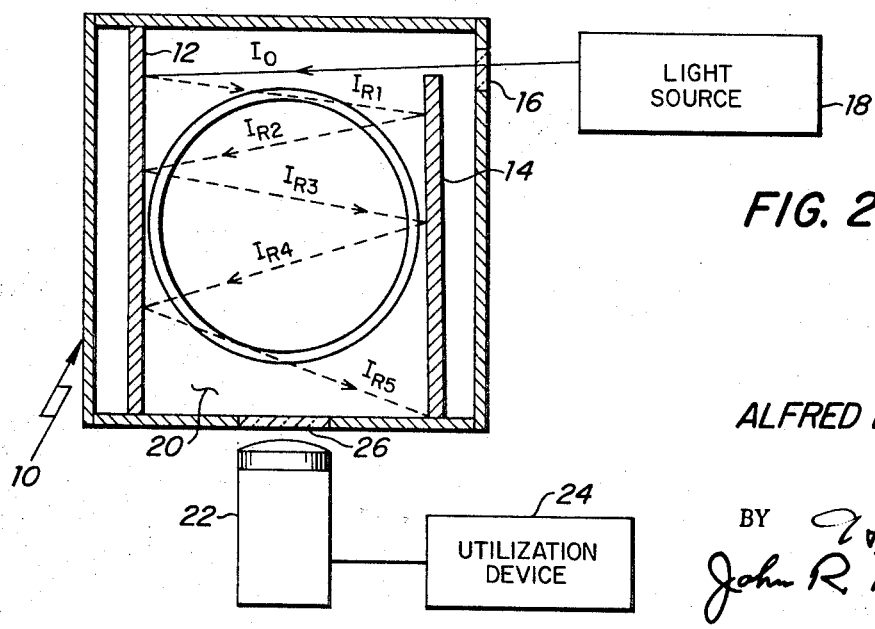
FIG. 2 is a cross-sectional view of the embodiment of FIG. 1, taken along line 2–2 of FIG. 1, and, FIG. 3 is a transverse sectional view of another embodiment of the present invention.

Referring now to FIGS. 1 and 2 there is shown an enclosure 10, coupled to an exhaust line 12.1 and 12.2 of an evacuated system. The shape and dimension of the enclosure 10 may vary, depending on the intended use of the device in accordance with the needs of the user. First and second mirrors 12 and 14 are mounted within the enclosure 10 and form a portion of the inner walls thereof. It is preferred that the reflective surfaces of the mirrors 12 and 14 be highly planar and that they be disposed parallel with each other, spaced apart at a fixed distance. While the dimensions of the mirrors 12 and 14 may vary in accordance with the intended use, rectangular shaped mirrors are preferred. The device 10 is provided with a window 16 that is preferably formed near one end of the long axis.

As will be seen in FIG. 2 a window 16 is provided in the enclosure 10 so as to provide a means for communicating with the interior for projecting a beam of light into the enclosure. It is preferred to locate the window 16 near one end of the long axis of the mirror 14 as to be centered on the midline of the short axis thereof. A light source 18 is located adjacent to the window 16 and may be any conventional light source capable of projecting a high intensity coherent beam. However, a laser is preferred for use with the present invention. A conventional light source would, of necessity require means for collimating the beam projected from the light source. A high intensity coherent beam of light $I_0$ is then directed obliquely into the enclosure through the window 16 from the source 18, so as to strike the extremely reflective surface of the mirror 12 causing the incident beam $I_0$ to be reflected across the chamber 20, formed between the mirrors 12 and 14 onto the extremely reflective surface of the mirror 14. The reflected beam $I_{R1}$ is then reflected off the mirror 14, and beam $I_{R2}$ which is then reflected as shown, is directed obliquely onto the surface by the beam $I_{R3}$. This process of multiple reflections continues as $I_{R4}$, $I_{R5}$ etc. until such time as the beam is completely dissipated or trapped. It is considered an important feature of the present invention that the reflected beam $I_{R1}$ and each subsequently produced reflected beam be characterized as being coherent and have an intensity equal to just less than the intensity of the incident beam $I_0$. Accordingly, the zigzagged pattern of light produced in the space between the reflective surfaces of the mirrors 12 and 14 must be kept scatter-free. Hence, the practitioner of the invention may find it desirable to employ one or more light traps (not shown) in the enclosure or its environment. To preserve the integrity of the system, it is desirable that portions of the inner walls of the enclosure be provided with a reflective surface, in addition to mirrors 12 and 14, so that when scattering of the beams does occur, the scattered light may be reflected back into the space between the mirror 12 and the mirror 14.

A photoelectric detector 22 is mounted adjacent the enclosure for communication with a chamber 20 through a window 26, at the opposite end of the long axis of the mirror 14, and centrally positioned between the mirrors 12 and 14. The detector 22 is positioned so as to collect the scattered radiation produced when the reflected multiple passes of coherent light pass through the gas in the chamber 20. It is preferred that the photoelectric detector 22 be positioned so as to view the zigzagged arrangement of coherent light beams as a single intense beam of light. Thus, when photons are scattered by a beam passing through a gas, the scattering effect will be intensified, in accordance with the teachings of the present invention. A utilization device 24 is connected to the detector 22 to convert the output signal produced by the detector 22 to data meaningfully related to the gas density within the system being tested.

Numerous uses of the invention will now become readily apparent to those skilled in the art. For example, the invention may easily serve as a continuous monitor in a system being evacuated to indicate when the desired pressure within the system is reached.

Figure 3:
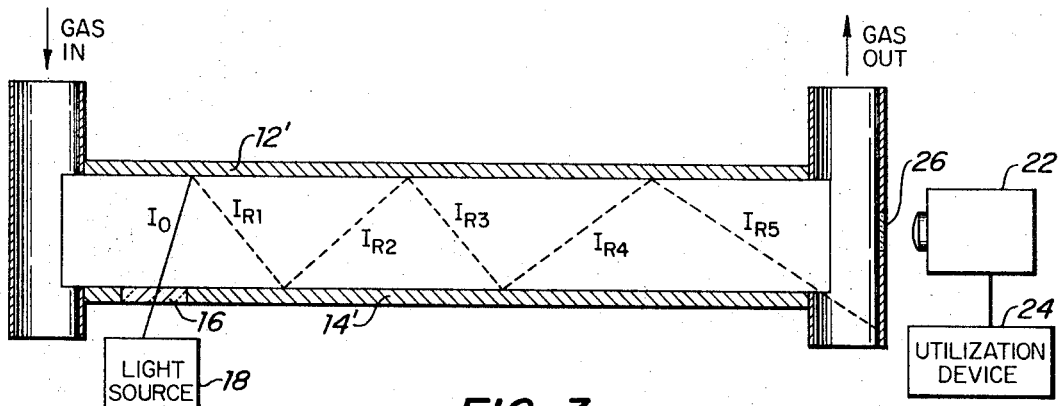

Referring now to the FIG. 3, there is shown another embodiment of the present invention suitable for use in evacuated system wherein extremely low gas densities will be encountered. The relative arrangement of elements illustrated in FIG. 3 is substantially identical to the arrangement illustrated in FIGS. 1 and 2. However, the embodiment of FIG. 3 is shown as having an elongate, tubular enclosure, with a pair of elongate, substantially rectangularly shaped planar mirrors 12 and 14 forming the inner walls of the chamber. In this embodiment the length of the long axis of the mirror 12' and mirror 14' is greater than twice the length of their respective short axis. This serves to greatly increase the beam path by providing an opportunity for a larger number of reflections to be produced in the area being viewed by the photodetector 22 and resulting in a corresponding increase in the intensity of the single coherent beam being viewed. Somewhat the same effect can be produced by increasing the distance between the parallel disposed mirrors (12' and 14') without increasing the long axis. However, the extent to which this can produce an increase in intensity of the single beam being viewed by the photodetector 22 is limited by the sensitivity of the device. For a given gas density optimum scattering of the coherent beams of light is produced when the greatest number of high intensity beams are combined to be viewed as a single coherent beam confined in a space having the smallest practical volume.

While I have described what is presently considered the preferred embodiment of my invention, it will be obvious to those skilled in the art that various other changes and modifications may be made therein without departing from the inventive concept contained therein.

I claim:

1. A device for measuring scattered radiation produced by the elastic collisions of photons with gas molecules in an evacuated system, comprising:

a shaped enclosure communicating with a system to be evacuated;

a laser beam source of light;

a pair of rectangularly shaped planar mirrors mounted parallel to each other in a fixed spatial relationship within the enclosure such that the direct laser beam can propagate only in the plane orthogonal to the plane of the mirrors;

a first transparent window in one wall of the enclosure located at a point near one end of the long axis of the mirror and adjacent said laser source of light and a second window located at the opposite end and positioned between said mirrors;

means for directing said laser beam through said first window and obliquely onto the surface of the other mirror, causing the beam of light to be successively reflected by the mirrors in the space therebetween; and photodetector means mounted axially in a plane parallel with the planes of the mirrors for measuring scattered radiation produced when the successive reflections of the beam pass through a gas.